(12) United States Patent  
Ogura

(10) Patent No.: US 8,340,434 B2
(45) Date of Patent: Dec. 25, 2012

(54) IMAGE PROCESSING APPARATUS, IMAGE PROCESSING SYSTEM AND COMPUTER READABLE MEDIUM

(75) Inventor: Takeshi Ogura, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 932 days.

(21) Appl. No.: 12/419,858

(22) Filed: Apr. 7, 2009

(65) Prior Publication Data
US 2009/0324094 A1 Dec. 31, 2009

(30) Foreign Application Priority Data

Jun. 25, 2008 (JP) ................. 2008-165892

(51) Int. Cl.
G06K 9/46 (2006.01)
G06K 9/00 (2006.01)
(52) U.S. Cl. ...................... 382/203; 382/181
(58) Field of Classification Search .......... 382/164, 382/165, 167, 177, 203, 289, 298, 305, 159; 382/176, 181, 209, 287, 294, 312; 358/506, 358/538; 704/1–10; 707/687, 749
See application file for complete search history.

(56) References Cited

U.S. PATENT DOCUMENTS

| 5,426,711 | A | * | 6/1995 | Kitamura | 382/187 |
| 5,659,765 | A | * | 8/1997 | Nii | 704/4 |
| 6,788,810 | B2 | * | 9/2004 | Fujiwara | 382/165 |
| 7,066,566 | B2 | | 6/2006 | Furukawa | |
| 7,177,452 | B2 | * | 2/2007 | Wong et al. | 382/128 |
| 7,194,403 | B2 | * | 3/2007 | Okura et al. | 704/7 |
| 7,295,965 | B2 | * | 11/2007 | Haigh et al. | 704/9 |
| 7,626,743 | B2 | * | 12/2009 | Ozawa | 358/538 |
| 7,826,659 | B2 | * | 11/2010 | Umeda | 382/167 |
| 8,139,897 | B2 | * | 3/2012 | Kojima | 382/298 |

FOREIGN PATENT DOCUMENTS

| JP | 561856 | A | 3/1993 |
| JP | 7-219202 | A | 8/1995 |
| JP | 2003-208568 | A | 7/2003 |
| JP | 2004-246110 | A | 9/2004 |
| JP | 2007-317033 | A | 12/2007 |

OTHER PUBLICATIONS

Japanese Office Action dated May 29, 2012 in counterpart Japanese Patent Application No. 2008-165892.

* cited by examiner

Primary Examiner — Kanjibhai Patel
(74) Attorney, Agent, or Firm — Sughrue Mion, PLLC

(57) ABSTRACT

A computer readable medium storing a program causing a computer to execute a process for image processing, the process includes: inputting first image data as a reference and second image data to be compared with the first image data; selecting a plurality of first sequences from different positions of the first image data, each of the plurality of first sequences includes first unit-image elements; determining whether or not a second sequence including second unit-image elements, having identity in an alignment of shapes with respect to the plurality of first sequences, exists in the second image data; and detecting from the second sequence determined not to exist in the second image data, a unit-image element not having the identity in the alignment of shapes with respect to the first image data among the second image data.

6 Claims, 8 Drawing Sheets

IMAGE PROCESSING APPARATUS, IMAGE PROCESSING SYSTEM AND COMPUTER READABLE MEDIUM

CROSS-REFERENCE TO RELATED APPLICATIONS

This application is based on and claims priority under 35 USC 119 from Japanese Patent Application No. 2008-165892 filed Jun. 25, 2009.

BACKGROUND

1. Technical Field

The present invention relates to an image processing apparatus, an image processing system and a computer readable medium.

2. Related Art

Digital inspection apparatuses for assisting an inspection processing in which image data before correction and image data after the correction are compared to thereby check whether or not the correction is made correctly are known.

SUMMARY

According to an aspect of the invention, A computer readable medium storing a program causing a computer to execute a process for image processing, the process includes: inputting first image data as a reference and second image data to be compared with the first image data; selecting a plurality of first sequences from different positions of the first image data, each of the plurality of first sequences includes first unit-image elements; determining whether or not a second sequence including second unit-image elements, having identity in an alignment of shapes with respect to the plurality of first sequences, exists in the second image data; and detecting from the second sequence determined not to exist in the second image data, a unit-image element not having the identity in the alignment of shapes with respect to the first image data among the second image data.

BRIEF DESCRIPTION OF THE DRAWINGS

Exemplary embodiment(s) of the present invention will be described in detail based on the following figures, wherein.

DETAILED DESCRIPTION

The image processing program according to an exemplary embodiment of the invention is a program causing a computer to execute a process, the process comprising: inputting first image data as a reference and second image data to be compared with the first image data; selecting a plurality of first sequences from different positions of the first image data, each of the plurality of first sequences includes first unit-image elements; determining whether or not one of a plurality of second sequences of second unit-image elements, having identity in an alignment of shapes with respect to the plurality of first sequences, exists in the second image data; and detecting the one of the second sequence determined not to exist in the second image data as a unit-image element not having the identity in the alignment of shapes with respect to the first image data among the second image data.

The "unit-image element" indicates an image which occupies a region in image data and contains a character image, for example. The shape of the region of the unit-image element maybe a rectangle, a circle, an ellipse or other polygon etc., but is not limited thereto. In each of first and second exemplary embodiments, the shape of the unit-image element is set as a circumscribed rectangle. Further, the unit-image elements may be regions having the same size or having different sizes from one another. Furthermore, the unit-image element may represent a character image itself.

The "image data" may be data capable of obtaining information relating to the unit-image element and the shape of the unit-image element. For example, the image data may be data of the raster format such as BMP, TIFF, PNG, GIF, or data of the vector format described by the page-description language (PDL) etc., or data of the unique format. The image data may contain a table, a picture etc., for example, in addition to characters. Further, the image data may contain image data generated by optically scanning a document.

The "character" is contained as a character image within the image data and configured by the combination of dots and lines etc. The character may be an ideogram such as a numeral or a Chinese character representing a meaning or content in some language or a phonogram such as a Japanese syllabary or alphabet. The character contains a pictorial symbol, a decorated symbol, a drafting symbol, an electric circuit symbol, a map symbol or a meteorological symbol, etc. Further, the character may be a printing type or a handwritten character.

The "identity in the alignment of shapes" indicates not only the case where the first sequence and the second sequence are completely same in the alignment of the shape and the outward appearance etc. but also the case where they have the similar shape or high in the similarity, and further also the case where the patterns contained in the first and second sequences are same or similar.

[First Exemplary Embodiment]

Figure 1:
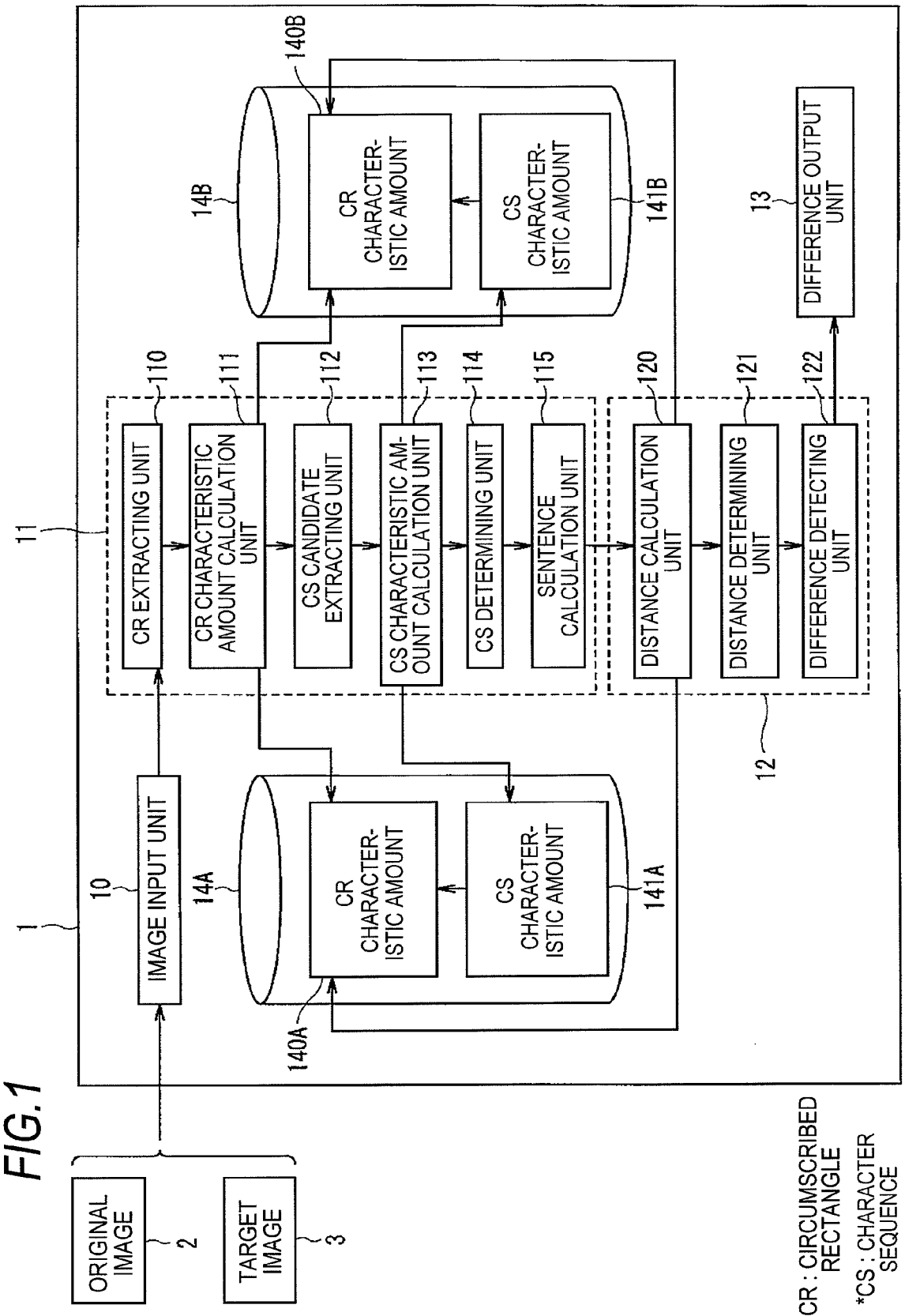
FIG. 1 shows a schematic diagram showing an example of the entire configuration of the image processing apparatus according to the first exemplary embodiment of the invention.

FIG. 1 is a schematic diagram showing an example of the configuration of the image processing apparatus according to the first exemplary embodiment of the invention. The image processing apparatus 1 is configured by an image input unit 10 for inputting two image data of an original image 2 and a target image 3, a sentence obtaining unit 11 for obtaining an original sentence and a target sentence from these two image data, a difference obtaining unit 12 for comparing the original sentence with the target sentence to thereby obtain different characters, a difference output unit 13 acting as an output unit for outputting the different characters obtained by the difference obtaining unit 12, and first and second storage units 14A, 14B for storing characteristic amounts obtained from the original image 2 and the target image 3 by the sentence obtaining unit 11, respectively.

The original image 2 is image data containing an original sentence as a reference. The target image 3 is image data containing a target sentence to be compared with the original sentence.

Each of an original sentence and a target sentence is configured by a plurality of character sequences. A character sequence is formed by plural characters. One of an original sentence and a target sentence may be a typed sentence and the other may be a hand-written sentence. Alternatively, each of an original sentence and a target sentence may be a typed sentence or a hand-written sentence. Further, alternatively, a sentence may be formed by typed characters and hand-written characters.

The "different characters" indicates characters which differ in the alignment of shapes between an original sentence and a target sentence, for example, characters changed due to correction, insertion, deletion etc., for example.

(Image Input Unit)

The image input unit 10 inputs an original image 2 and a target image 3 as image data designated by a user. The image input unit 10 may be connected to an image reading device such as a scanner, a digital camera or a composite machine so as to input image data therefrom. Alternatively, the image input unit 10 may obtain image data from an external recording medium such as an optical disk or a semiconductor memory.

(Sentence Obtaining Unit)

The sentence obtaining unit 11 subjects the two image data of the original image 2 and the target image 3 inputted via the image input unit 10 to a series of image processings to thereby obtain an original sentence and a target sentence.

That is, the sentence obtaining unit 11 includes a circumscribed rectangle extracting unit 110 for extracting circumscribed rectangles each containing a character image therein from each of the two image data, a circumscribed rectangle characteristic amount calculation unit 111 for calculating circumscribed rectangle characteristic amounts for each of the extracted circumscribed rectangles, a character sequence candidate extracting unit 112 for extracting a character sequence candidate formed by a plurality of the circumscribed rectangles, a character sequence characteristic amount calculation unit 113 for subjecting the extracted character sequence candidate to an image recognition processing to thereby calculate character sequence characteristic amounts, a character sequence determining unit 114 for determining whether or not the character sequence candidate is a character sequence based on the calculated character sequence characteristic amounts, and a sentence calculation unit 115 for coupling the character sequence candidates each thus determined as a character sequence to thereby calculate the original sentence and the target sentence.

The "image recognition processing" is a processing which processing amount is smaller than that of an OCR processing. For example, this processing is a processing for obtaining characteristic information relating to a character image contained in the circumscribed rectangle for each of the circumscribed rectangles constituting the character sequence candidate. To be concrete, the image recognition processing performs a pre-processing such as a noise eliminating processing, and then obtains, as the characteristic information, an average luminance of pixels, an area and a width of a character image, a distribution of the directions and the curvatures of edges (contour of the character image) etc. contained in the circumscribed rectangle.

The circumscribed rectangle characteristic amounts include, for example, the characteristic information obtained by the image recognition processing and information such as the position and size of the circumscribed rectangle in the image data. Further, the character sequence characteristic amounts include, for example, characteristic information of respective circumscribed rectangles constituting the character sequence candidate, and information of the position, size, color and direction (vertical writing, horizontal writing) etc. of the area where the character sequence candidate is disposed in the image data.

(Difference Obtaining Unit)

The difference obtaining unit 12 includes a distance calculation unit 120, a distance determining unit 121 and a difference detecting unit 122.

The distance calculation unit 120 selects a plurality of first character sequences from different positions of the original sentence, and calculates a determination reference value (representative evaluation information) for determining whether or not the target sentence includes a second character sequence which has the same alignment of shapes with one of the plurality of the first character sequences thus selected.

In this exemplary embodiment, the distance calculation unit 120 calculates distances on a character space based on the circumscribed rectangle characteristic amounts of the circumscribed rectangles constituting the first and second character sequences to thereby calculate the determination reference value. The distance on the character space (hereinafter referred to "distance") is an index representing whether or not, when comparing characters to each other, the alignments of shapes are same between the characters. The distance becomes a relatively small value when the characters are determined to be same. The distance calculation unit 120 may employ various kinds of distance calculation methods such as the Euclidean distance or the city block distance.

The distance determining unit 121 determines whether or not the second character sequence exists in the target sentence based on the determination reference value thus calculated by the distance calculation unit 120 and sends the determination result to the difference detecting unit 122.

The difference detecting unit 122 detects characters of the target sentence being not same in the alignments of shapes with respect to the original sentence as different characters.

(Difference Output Unit)

The difference output unit 13 is configured by a liquid crystal display etc., for example, and outputs and displays the different character obtained by the difference obtaining unit 12 on a screen in a state of being able to compare with the target sentence. The difference output unit 13 may not output and display the different character but may output to a printer so as to print the different character or write into a storage device, for example.

(First and Second Storage Units)

Each of the first and second storage units 14A, 14B is configured by a ROM, a RAM or a hard disc drive etc.

The first storage unit 14A stores circumscribed rectangle characteristic amounts 140A calculated by the circumscribed rectangle characteristic amount calculation unit 111 based on the original image 2 and character sequence characteristic amounts 141A calculated by the circumscribed rectangle characteristic amount calculation unit 111 based on the original image. The second storage unit 14B stores circumscribed rectangle characteristic amounts 140B calculated in the similar manner based on the target image 3 and character sequence characteristic amounts 141B calculated based on the target image. The first and second storage units 14A, 14B may be configured as a single storage unit.

Such the image processing apparatus 1 can be configured by a personal computer (PC), a personal digital assistance (PDA) or a mobile phone etc.

The respective units of the difference obtaining unit 12 are operated in response to that a control unit (not shown) having a CPU etc. provided at the image processing apparatus 1 is operated in accordance with an image processing program stored in the storage unit, for example. Further, similarly, the respective units of the sentence obtaining unit 11 are operated in response to that the control unit is operated in accordance with a sentence obtaining program. The image processing program and the sentence obtaining program may be configured as a single program.

Operation of the First Exemplary Embodiment

Next, an example of the operation of the image processing apparatus 1 according to the exemplary embodiment will be explained with reference to FIGS. 2A to 7.

(1) Input of Image Data

First, a user designates the original image 2 and the target image 3 and inputs the image data of these two images to the image input unit 10. Then, the image input unit 10 sends the original image 2 and the target image 3 thus designated to the circumscribed rectangle extracting unit 110.

Figure 2A:
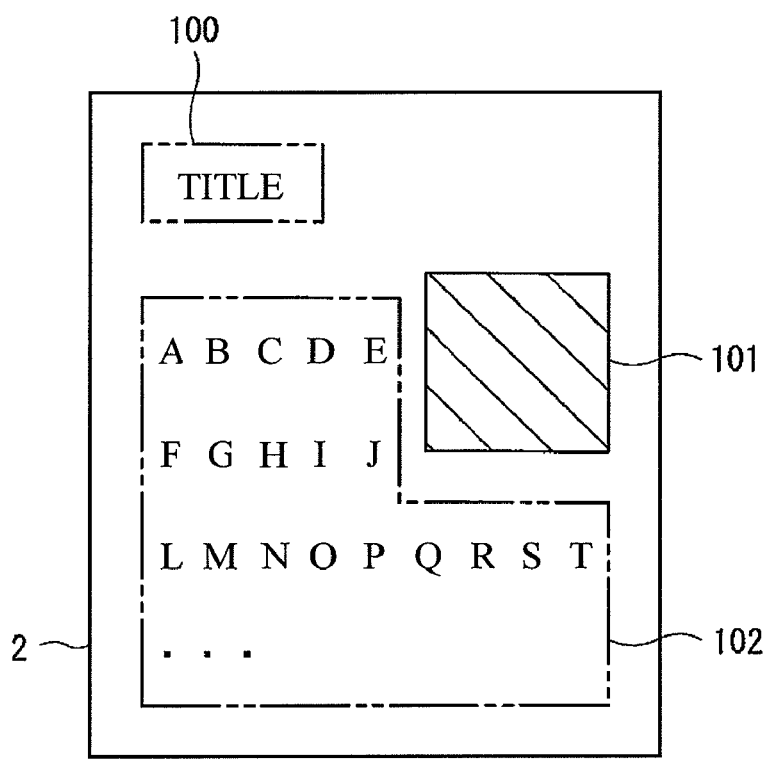
FIG. 2A shows a diagram showing an example of an original image.

FIG. 2A is a diagram showing an example of the original image. The original image 2 is constituted, for example, by a title unit 100 as an arbitrary character sequence, a graphic unit 101 such as a table or a picture, an original sentence unit 102 containing the original document, etc. The original sentence unit 102 is constituted by plural characters arranged on plural lines. The original image 2 may contain a plurality of the graphic units 101 and a plurality of the original sentence units 102.

Figure 2B:
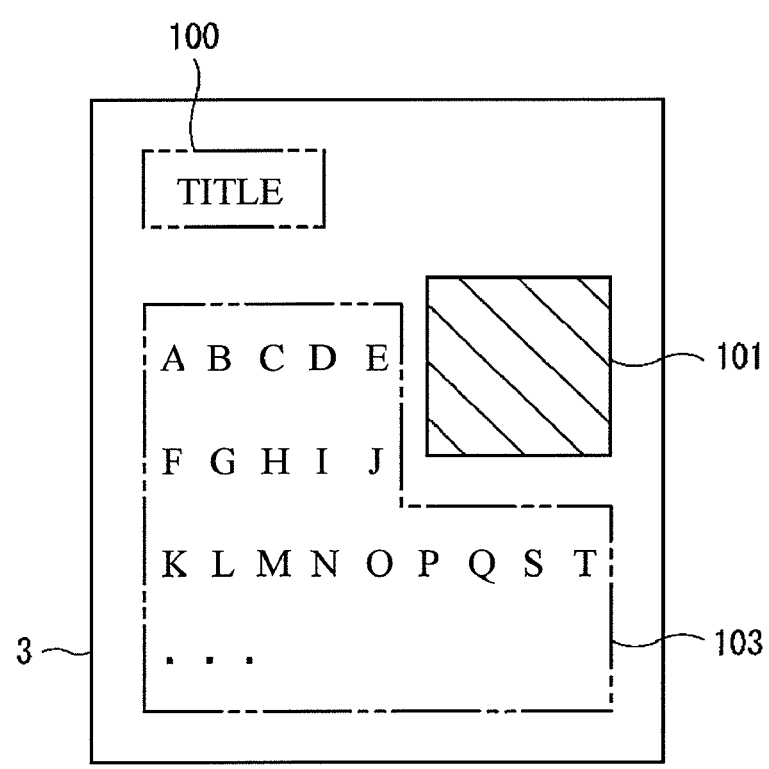
FIG. 2B shows a diagram showing an example of a target image.

FIG. 2B is a diagram showing an example of the target image. The target image 3 is an image data which is partially changed from the original sentence unit 102 of the original image 2 exemplarily shown in FIG. 2A. That is, the target image 3 is constituted not only by the title unit 100 and the graphic unit 101 like the original image 2 but also by a target sentence unit 103 containing the target sentence which is partially changed from the original sentence by a user, etc.

(2) Obtaining Sentence

The circumscribed rectangle extracting unit 110 of the sentence obtaining unit 11 subjects the two image data thus inputted to the image processing to thereby extract a plurality of circumscribed rectangles each containing a region recognized as a character in each of the original sentence unit 102 and the target sentence unit 103.

Figure 3A:
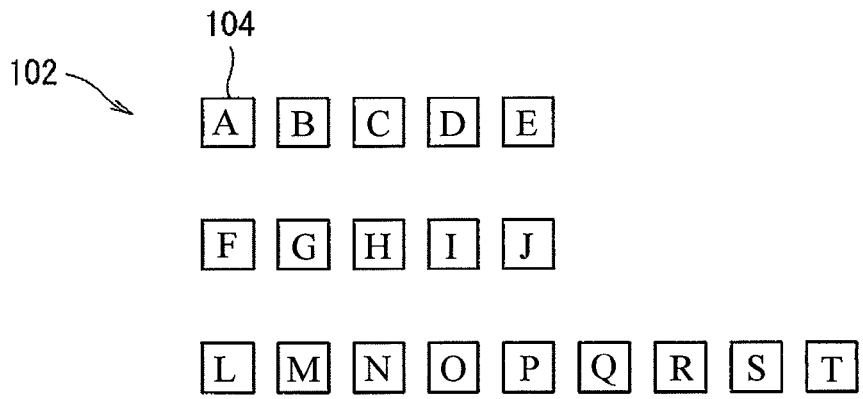
FIG. 3A shows a diagram showing an example of a circumscribed rectangle extracted by a circumscribed rectangle extracting unit.

FIG. 3A is a diagram showing an example of the circumscribed rectangle extracted by the circumscribed rectangle extracting unit 110. The circumscribed rectangle extracting unit 110 extracts the circumscribed rectangle 104 for each of the characters constituting the original sentence within the original sentence unit 102. The circumscribed rectangle extracting unit 110 also extracts the circumscribed rectangles 104 within the target sentence unit 103 in the similar manner.

Next, the circumscribed rectangle characteristic amount calculation unit 111 calculates the circumscribed rectangle characteristic amounts 140A, 140B with respect to each of the circumscribed rectangles 104 extracted from the two images. The circumscribed rectangle characteristic amount calculation unit 111 stores the circumscribed rectangle characteristic amounts 140A, 140B thus calculated into the first and second storage units 14A, 14B corresponding to the two images respectively, in relation to the circumscribed rectangles 104 as the calculation source. In this stage, the characteristic information of the circumscribed rectangle characteristic amounts is not calculated yet.

Next, the character sequence candidate extracting unit 112 couples a plurality of the circumscribed rectangles 104 extracted by the circumscribed rectangle extracting unit 110 to thereby extract a character sequence candidate configured by the plurality of the circumscribed rectangles 104. For example, the character sequence candidate extracting unit 112 extracts the two circumscribed rectangles 104 and calculate a distance between these circumscribed rectangles 104 from the circumscribed rectangle characteristic amounts. When the distance is equal to or smaller than a value, the character sequence candidate extracting unit 112 combines these two circumscribed rectangles 104 to thereby extract one character sequence candidate. Further, when there is another circumscribed rectangle 104 which distance from this character sequence candidate is equal to or smaller than the value, the character sequence candidate extracting unit 112, the another circumscribed rectangle 104 is further coupled to the character sequence candidate.

Figure 3B:
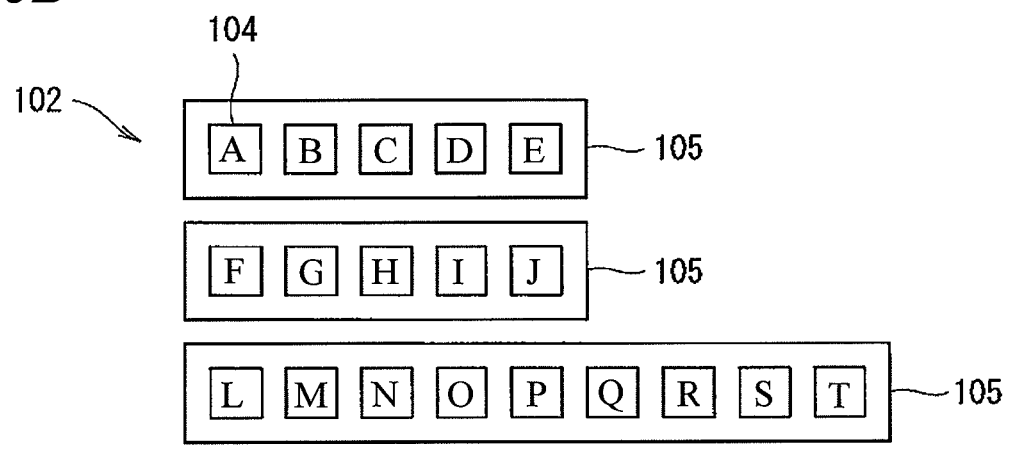
FIG. 3B shows a diagram showing an example of a character sequence candidate extracted by a character sequence candidate extracting unit.

FIG. 3B is a diagram showing an example of the character sequence candidates extracted by the character sequence candidate extracting unit 112. The character sequence candidate extracting unit 112 couples a plurality of the circumscribed rectangles 104 constituting the original sentence unit 102 for each line to thereby extract a plurality of the character sequence candidates 105. The character sequence candidate extracting unit 112 also extracts character sequence candidates 105 as to the target image 3 in the similar manner.

Next, the character sequence characteristic amount calculation unit 113 subjects each of the character sequence candidates 105 extracted by the character sequence candidate extracting unit 112 to the image recognition processing to thereby calculate the character sequence characteristic amounts 141A, 141B. Then, the character sequence characteristic amount calculation unit 113 stores the calculated character sequence characteristic amounts in association with the character sequence candidates 105 of the calculation sources into the first and second storage units 14A, 14B corresponding to these two image data, respectively.

Then, the character sequence characteristic amount calculation unit 113 resolves the character sequence characteristic amounts 141A, 141B thus calculated for each of the circumscribed rectangles 104, and stores the respective characteristic information thus obtained by the resolution in association with the circumscribed rectangles 104 into the first and second storage units 14A, 14B as the characteristic information of the character sequence characteristic amounts 141A, 141B, respectively.

Thereafter, the character sequence determining unit 114 determines whether or not the character sequence candidate 105 contains a character sequence based on the character sequence characteristic amounts extracted by the character sequence characteristic amount calculation unit 113.

Next, the sentence calculation unit 115 combines the character sequence candidates 105 each of which is determined to contain the character sequence to thereby calculate the original sentence and the target sentence. For example, the sentence calculation unit 115 determines whether or not the character sequence candidates are combined by using the positions, sizes, colors, directions etc. of the regions where the character sequence candidates are disposed in the character sequence characteristic amounts, and calculates the original sentence and the target sentence. Then, the sentence calculation unit 115 sends the original sentence and the target sentence thus calculated to the difference obtaining unit 12.

Figure 3C:
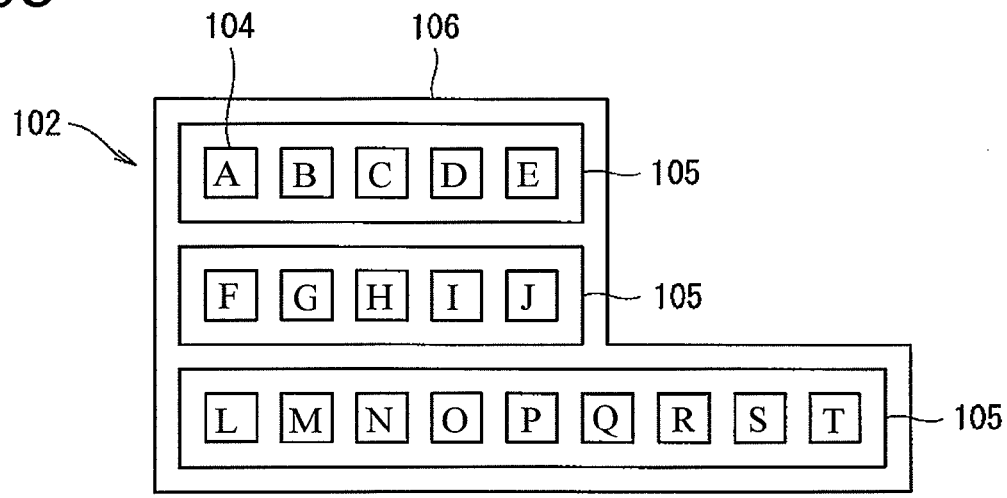
FIG. 3C is a diagram showing an example of an original sentence calculated by a sentence calculation unit.

FIG. 3C is a diagram showing an example of the original sentence calculated by the sentence calculation unit 115. The sentence calculation unit 115 combines the character sequence candidates 105 of the respective lines to calculate the original sentence 106. The sentence calculation unit 115 also calculate the target sentence as to the target image 3 in the similar manner.

(3) Obtaining Different Character

When the distance calculation unit 120 of the difference obtaining unit 12 receives the original sentence and the target sentence calculated by the sentence calculation unit 115, the distance calculation unit 115 reads the circumscribed rectangle characteristic amounts 140A, 140B of the respective circumscribed rectangles 104 constituting these sentences from the first and second storage units 14A, 14B.

Then, the distance calculation unit 120 stores, in order to sequentially performing the processing on a circumscribed rectangle unit basis, the circumscribed rectangle characteristic amounts 140A, 140B thereof into the respective elements of an original linear list Ro(i) (where, i=1, 2, ... M, and M represents the number of the characters of the original sentence) and a target linear list Rt(j) (where, j=1, 2, ... N, and N represents the number of the characters of the target sentence).

Next, the distance calculation unit 120 calculates determination reference value Sj (j=1, 2, ... N) of the respective circumscribed rectangles constituting the target sentence in accordance with a flowchart of FIG. 6.

First, the distance calculation unit 120 initializes a target counter j for sequentially selecting the first noticed circumscribed rectangle representing one element to be noticed in the target linear list Rt(j) to "1" (S1).

Then, in the similar manner, the distance calculation unit 120 initializes an original counter i for sequentially selecting the second noticed circumscribed rectangle representing one element to be noticed in the original linear list Ro(i) to "1" (S10).

Next, the distance calculation unit 120 calculates a circumscribed rectangle distance Dij between the first noticed circumscribed rectangle selected by the original counter i and k circumscribed rectangles before and after the first noticed circumscribed rectangle and the second noticed circumscribed rectangle selected by the target counter j and k circumscribed rectangles before and after the second noticed circumscribed rectangle by using the circumscribed rectangle characteristic amounts 140A, 140B (S11). This calculation method can be represented by the following calculation expression.

$$D_{ij} = \sum_{-k}^{k} \{Ro(i+k) - Rt(j+k)\}^2 \quad \text{(Numeral 1)}$$

where k denotes number of characters for calculating distance.

Figure 4:
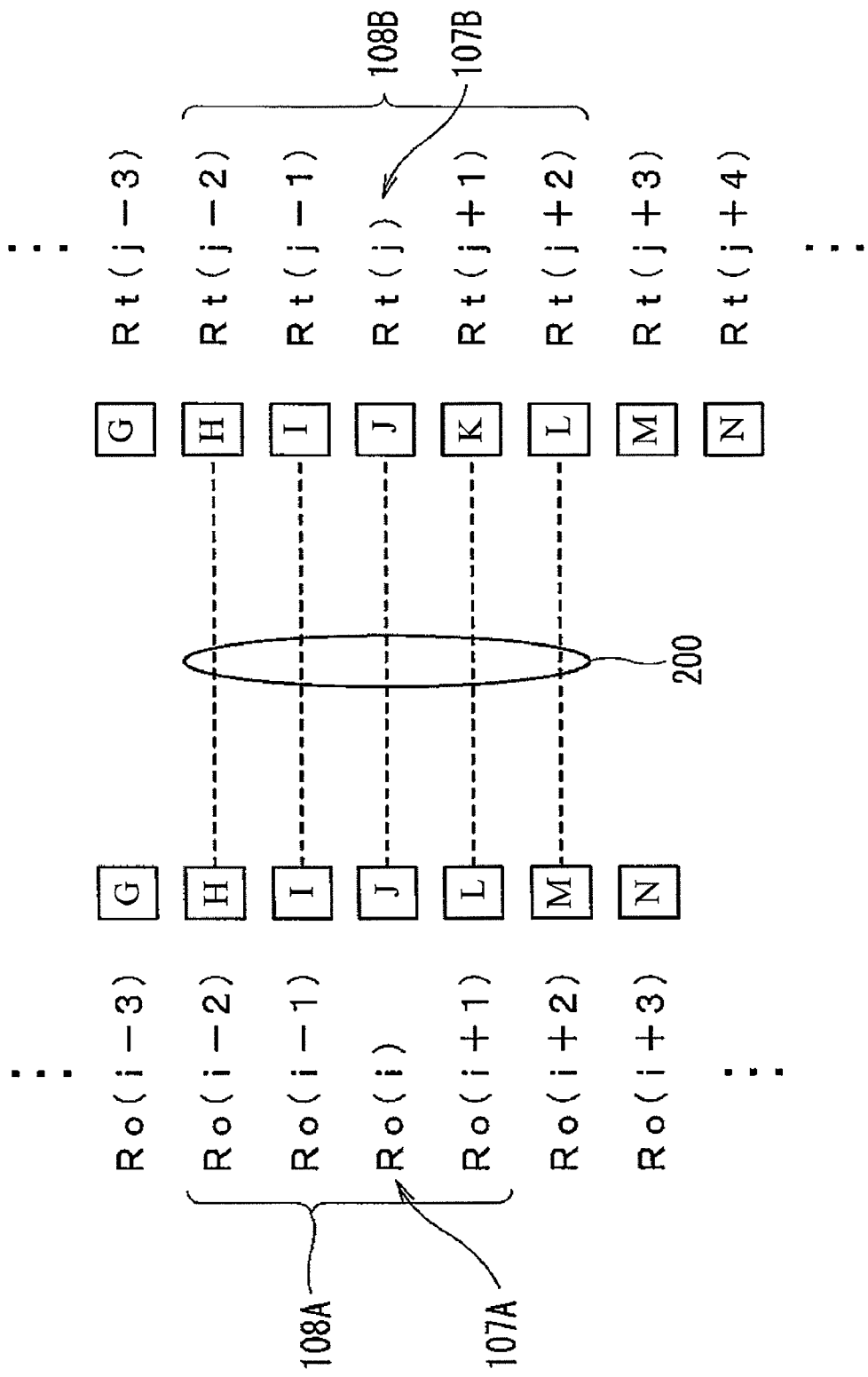
FIG. 4 shows a diagram for explaining an example of the method of calculating a circumscribed rectangle distance.

FIG. 4 is a diagram for explaining an example of the method of calculating the circumscribed rectangle distance. In FIG. 4, each of the first and second noticed circumscribed rectangles 107A, 107B is the circumscribed rectangle of a character "J" and the number k of characters for calculating distance is "2". Further, the first noticed circumscribed rectangle 107A and the two circumscribed rectangles each before and after the first noticed circumscribed rectangle are set as a first circumscribed rectangle sequence (an example first sequence) 108A, and the second noticed circumscribed rectangle 107B and the two circumscribed rectangles each before and after the second noticed circumscribed rectangle are set as a second circumscribed rectangle sequence (an example of second sequence) 10B.

In this case, the distance calculation unit 120 calculates a distance between the first circumscribed rectangle sequence 108A and the second circumscribed rectangle sequence 108B by using the circumscribed rectangle characteristic amounts 140A, 140B of the circumscribed rectangles. To be concrete, the distance calculation unit 120 calculates distances based on five sets of the circumscribed rectangle characteristic amounts, that is, a set of Ro(i−2) and Rt(j−2), a set of Ro(i−1) and Rt (j−1), a set of Ro (i) and Rt (j), a set of Ro (i+1) and Rt (j+1), and a set of Ro (i+2) and Rt (j+2), and then calculates the circumscribed rectangle distance 200 as a total of these five distances.

Next, the distance calculation unit 120 calculates first and second relevance information respectively representing the relevance between the circumscribed rectangles included in the first and second circumscribed rectangle sequences 108A, 108B. Then, the distance calculation unit 120 compares the first and second relevance information to thereby calculate a circumscribed rectangle relevance distance Eij (S12). This calculation method can be represented by the following calculation expression.

$$E_{ij} = \sum_{-k}^{k} \{(Ro(i) - Ro(i+k))^2 - (Rt(j) - Rt(j+k))^2\}^2 \quad \text{(Numeral 2)}$$

Figure 5:
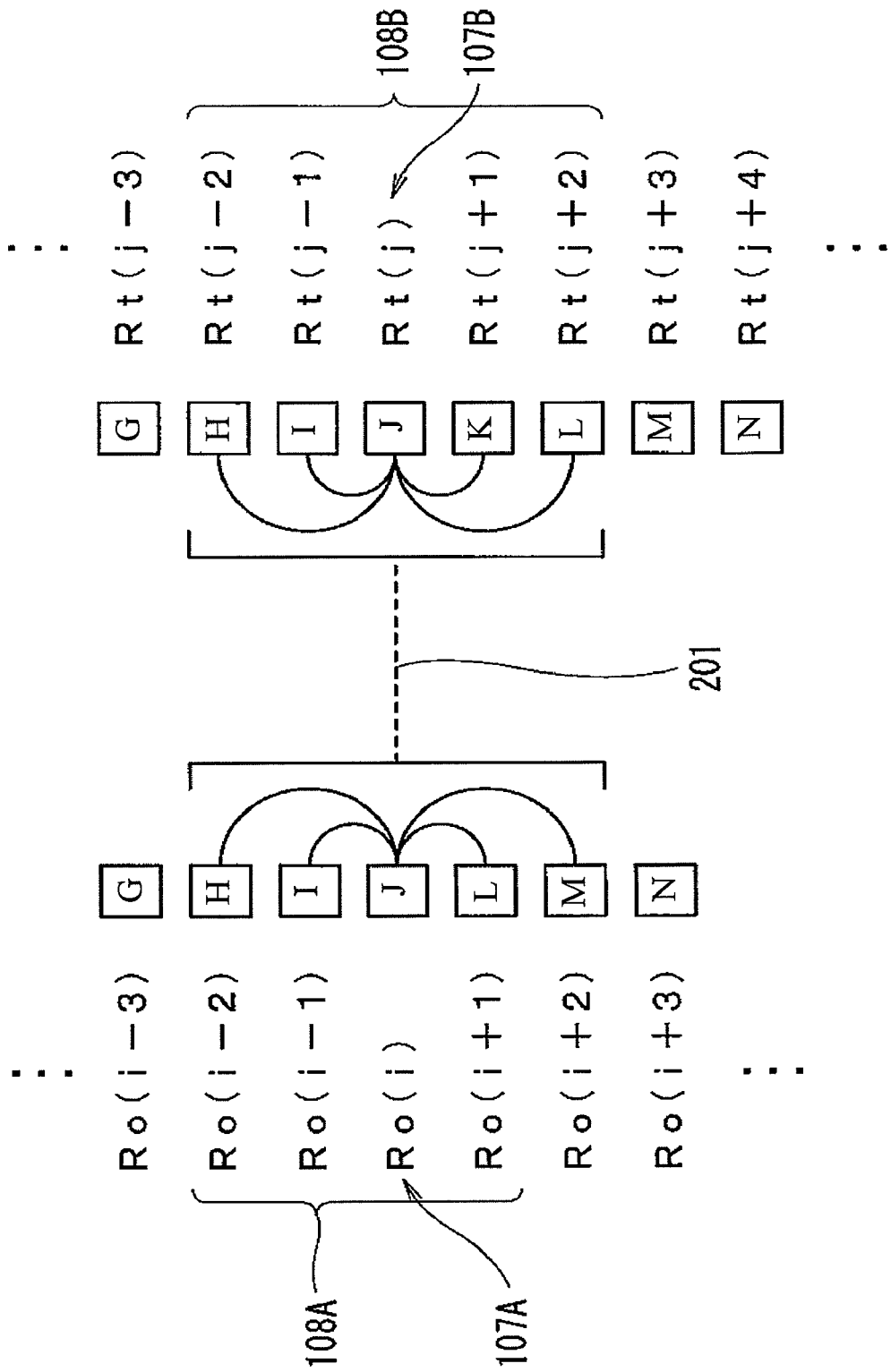
FIG. 5 shows a diagram for explaining an example of the method of calculating a circumscribed rectangle relevance distance.
Figure 6:
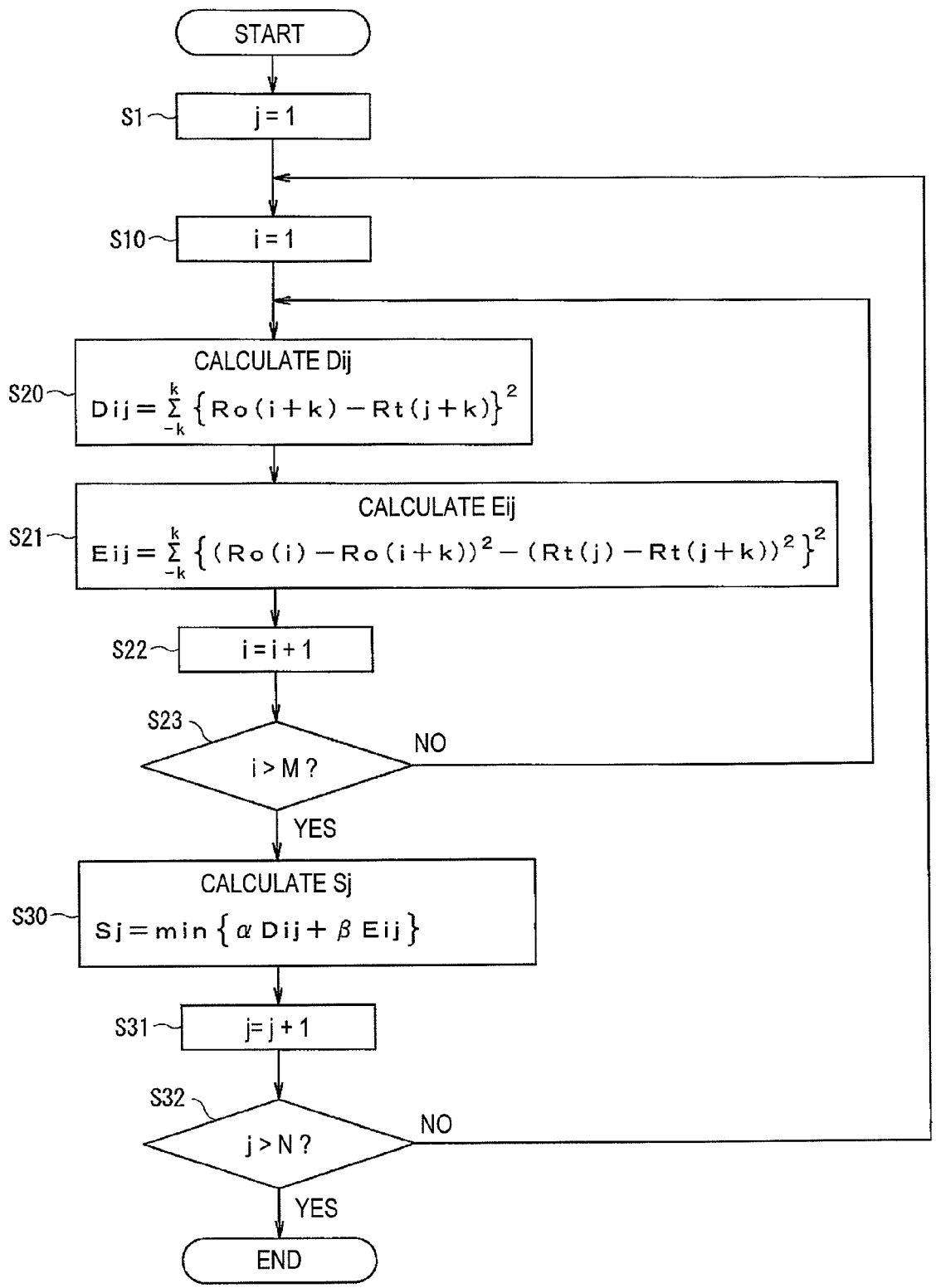
FIG. 6 shows a flowchart showing an example of the operation for calculating a determination reference value.

FIG. 5 is a diagram for explaining an example of the method of calculating the circumscribed rectangle relevance distance. The noticed circumscribed rectangles and the number k of characters for calculating distance in FIG. 5 are same as those of FIG. 4.

In this case, the distance calculation unit 120 calculates respective distances between the first noticed circumscribed rectangle 107A and the two circumscribed rectangles each before and after the first noticed circumscribed rectangle as to the first circumscribed rectangle sequence 108A by using the circumscribed rectangle characteristic amounts. To be concrete, the distance calculation unit 120 calculates distances based on four sets of the circumscribed rectangle characteristic amounts, that is, a set of Ro (i−2) and R0 (i), a set of Ro (i−1) and Ro (i), a set of Ro (I+1) and Ro (i) and a set of Ro (i+2) and Ro(i), and then calculates the first relevance information as a total of these four distances. A distance obtained from a set of other circumscribed rectangles, for example, a set of Ro (i−2) and RO (i+2) may be added to the first relevance information.

Next, the distance calculation unit 120 also calculates respective distances between the second noticed circumscribed rectangle 107B and the two circumscribed rectangles each before and after the first noticed circumscribed rectangle as to the second circumscribed rectangle sequence 108B by using the circumscribed rectangle characteristic amounts, and calculates the second relevance information as a total of these four distances. Then, the distance calculation unit 120 calculates a difference between the first and second relevance information to thereby calculate the circumscribed rectangle relevance distance 201.

Then, the distance calculation unit 120 increments the original counter i (S22) and shifts the first noticed circumscribed rectangle 107A in the original linear list Ro (i) by one. As a result, when the content of the original counter i does not exceed the number M of the characters of the original sentence (No in S23), the process returns to step S20.

In contrast, when the content of the original counter i exceeds the number M of the characters of the original sentence (Yes in S23), the distance calculation unit 120 retrieves a target count j where the evaluation value (evaluation information) obtained by adding the circumscribed rectangle distance Dij and the circumscribed rectangle relevance distance Eij each calculated in the aforesaid manner becomes minimum. Then, the distance calculation unit 120 calculates the determination reference value Sj as the minimum value thus retrieved (S30). This calculation method can be represented by the following calculation expression.

$$S_j = \min\{\alpha D_{ij} + \beta E_{ij}\}$$  Numeral 3 where α denotes an arbitrary coefficient, β denotes an arbitrary coefficient.

Then, the distance calculation unit 120 increments the target counter j by one (S22) and shifts the second noticed circumscribed rectangle 107B in the target linear list Rt(j) by one. As a result, when the content of the target counter j does not exceed the number N of the characters of the target sentence (No in S32), the process returns to step S10. In contrast, when the content of the target counter exceeds the number (Yes in S32), the process is terminated.

In the aforesaid manner, the distance calculation unit 120 calculates the determination reference value Sj for each of the circumscribed rectangles constituting the target sentence. Then, the distance determining unit 121 compares the determination reference value Sj calculated for each of the circumscribed rectangles with a threshold value (threshold information) to thereby determine whether or not each of the determination reference values exceeds the threshold value, and output the determination results to the difference detecting unit 122.

Next, the difference detecting unit 122 receives the determination results from the distance determining unit 121 and detects, when the determination reference value is determined to exceed the threshold value, a character contained in the circumscribed rectangle corresponding to the determination reference value as a different character.

(4) Display of Difference Output Screen

The difference output unit 13 outputs the different character detected by the difference detecting unit 122 to the difference output screen.

Figure 7:
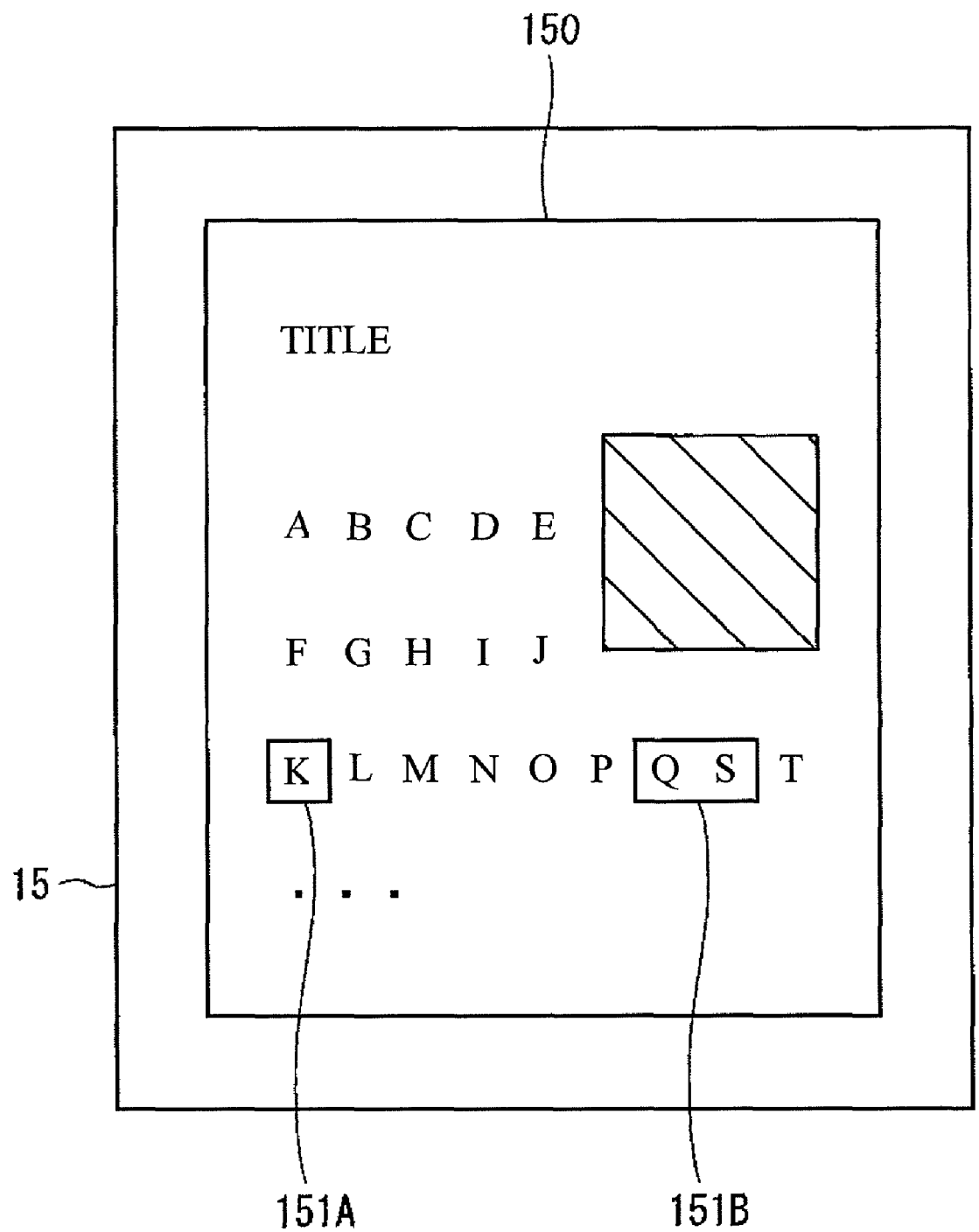
FIG. 7 shows a diagram showing an example of a difference output screen.

FIG. 7 is a diagram showing an example of the difference output screen. The difference output screen 15 is provided with a target image display region 150 for displaying the target image 3. The target image display region 150 displays the circumscribed rectangles detected as the different characters in a state of being surrounded by frames 151A, 151B, for example.

The first frame 151A displays that a character "K" is inserted into the original sentence. The second frame 151B displays that a character "R" existed between characters "QS" in the original sentence is deleted. The unit outside of the frames 151A, 151B may be displayed in a state being subjected to the blurring processing, for example. The difference output screen 15 may be added with a function of operating the target image display region 150 such as an enlargement, a reduction or a movement or a function of printing the target image display region 150.

Then, a user visually confirms the difference output screen 15 to confirm the changed units with respect to the original image 2, that is, the characters within these first and second frames 151A, 151B and checks whether or not the change is made as intended or the change not being intended is contained, for example.

In the aforesaid manner, only different characters are detected in view of the alignment of characters by comparing character sequences to each other and displayed on the difference output screen 15.

(Second Exemplary Embodiment)

Figure 8:
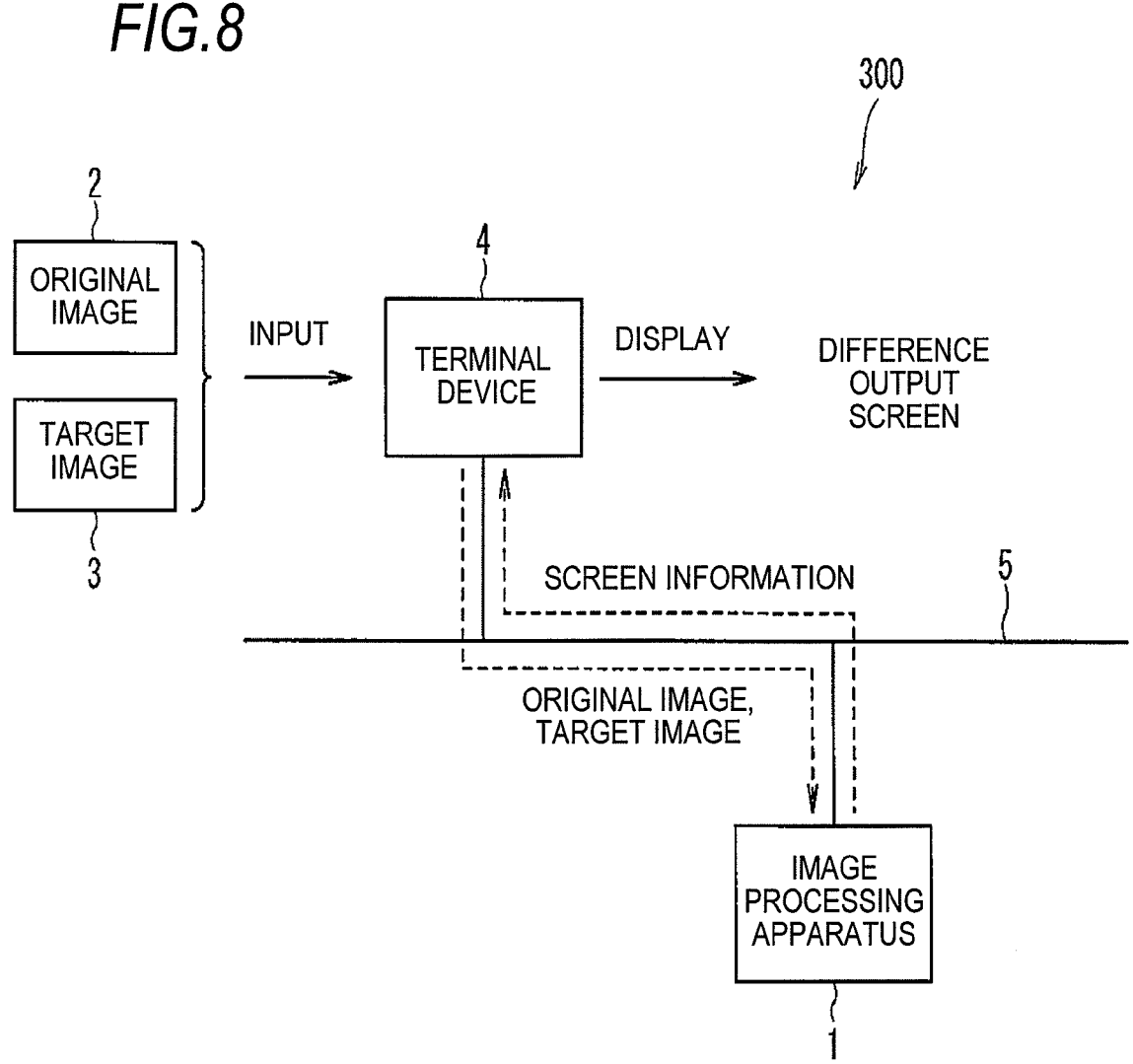
FIG. 8 shows a schematic diagram showing an example of the entire configuration of the image processing system according to the second exemplary embodiment of the invention.

FIG. 8 is an entire diagram showing an example of the schematic configuration of the image processing system according to the second exemplary embodiment of the invention. In the first exemplary embodiment, the image processing apparatus 1 is provided with the three functions, that is, the function of inputting the original image 2 and the target image 3, the difference detection function with respect to the inputted two images, and display output function of displaying different characters thus detected. In contrast, the image processing system 300 according to this exemplary embodiment is configured by an image processing apparatus 1 having the difference detection function, a terminal device 4 having the input function and the display output function, and a network 5 for mutually coupling the image processing apparatus 1 and the terminal device 4. The network 5 is a communication network such as a LAN (local area network) or the internet.

The terminal device 4 transmits the original image 2 and the target image 3 thus inputted to the image processing apparatus 1 via the network 5 and receives screen information as a response from the image processing apparatus 1. Then, the terminal device 4 displays the difference output screen exemplarily shown in FIG. 7 based on the screen information. Such the terminal device 4 may be configured by a personal digital assistance (PDA) or a mobile phone etc.

The image processing apparatus 1 includes an image input unit which receives the original image 2 and the target image 3 via the network 5 and a difference output unit which prepares the screen information for displaying different characters obtained by a difference obtaining unit and transmits the screen information to the terminal device 4. A sentence obtaining unit, the difference obtaining unit and first and second storage potions are configured in the similar manner as those of the first exemplary embodiment.

As explained above, the image processing apparatus 1 provides the difference detection function via the network 5 to the terminal device 4 disposed at a different location.

(Third Exemplary Embodiment)

Although the two image data of the original image 2 and the target image 3 is inputted into the image processing apparatus 1 in the first exemplary embodiment, two text data is inputted into the image processing apparatus 1 in this exemplary embodiment.

The "text data" unit data which is configured by designating a character sequence and the positions, font, font size etc. of the respective characters and is prepared by an application software such as a word-processing software, presentation software. Thus, the text data unit data in which a sentence is recorded as data and is not required to obtain sentence data by performing the image recognition processing like image data.

The image processing apparatus 1 according to this exemplary embodiment will be explained with reference to FIG. 1 as to the configuration different from the first exemplary embodiment.

The image input unit 10 of the image processing apparatus 1 inputs an original text and a target text as two text data. Since the original text and the target text are data capable of obtaining an original sentence and a target sentence therefrom, these texts are sent to the difference obtaining unit 12 without passing through the sentence obtaining unit 11.

The difference obtaining unit 12 obtains the original sentence and the target sentence form the original text and the target text respectively and performs the processing similar to that of the first exemplary embodiment to thereby different characters.

The image input unit 10 may input one image data and one text data. In this case, the image data is sent to the sentence obtaining unit 11 and the text data is sent to the difference obtaining unit 12. The difference obtaining unit 12 compares the sentence data obtained by the image data from the sentence obtaining unit 11 with the sentence data contained in the text data to thereby obtain different characters.

(Other Exemplary Embodiment)

The invention is not limited to the aforesaid exemplary embodiments and may be changed in various manners in a range not departing from the gist of the invention. For example, although, in each of the aforesaid exemplary embodiments, the respective units of the image processing apparatus are realized by the control unit and the image processing program, a part or all of them may be realized by a hardware.

Further, the programs used in the aforesaid exemplary embodiments may be read and stored into the storage unit within the apparatus from a recording medium such as a CD-ROM or may be downloaded into the storage unit within the apparatus from a server etc. coupled to a network such as the internet.

Further, although, in each of the aforesaid exemplary embodiments, each of the original sentence and the target sentence is prepared by the English language, the original sentence and the target sentence may be prepared by other languages so long as they are prepared by the same language.

Further, although, in each of the aforesaid exemplary embodiments, the identity of the shapes of characters is determined by using the characteristic information obtained by the image recognition processing, the identity of the shapes of characters may be determined by obtaining a difference image of a cut-out image containing characters to be compared and by comparing a threshold value with the total sum of pixels recognized as being different in the difference image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for image processing, the process comprising:
   inputting first image data as a reference and second image data to be compared with the first image data;
   selecting a plurality of first character sequences from different positions of the first image data, each of the plurality of first character sequences includes first unit-image elements;
   determining whether or not a second character sequence including second unit-image elements, having identity in an alignment of shapes with respect to the plurality of first character sequences, exists in the second image data;
   detecting from the second character sequence determined not to exist in the second image data, a unit-image element not having the identity in the alignment of shapes with respect to the first image data among the second image data; and
   outputting the detected unit-image element.

2. The non-transitory computer readable medium according to claim 1, wherein
   the determining includes:
   extracting first pieces of characteristic information from each of the first unit-image elements;
   extracting second pieces of characteristic information from each of the second unit-image elements;
   calculating a plurality of pieces of evaluation information between each of the plurality of first character sequences and the second character sequences by using the first and second pieces of characteristic information; and
   comparing representative evaluation information representative of the calculated plurality of pieces of evaluation information with threshold information.

3. The non-transitory computer readable medium according to claim 1, wherein
   the determining includes:
   extracting first pieces of characteristic information from each of the first unit-image elements;
   extracting second pieces of characteristic information from each of the second unit-image elements; and
   comparing the first pieces of characteristic information and the second pieces characteristic information at same positions within each of the plurality of first character sequences and the second character sequences.

4. The non-transitory computer readable medium according to claim 1, wherein
   the determining includes:
   extracting first pieces of characteristic information from each of the first unit-image elements;
   extracting second pieces of characteristic information from each of the second unit-image elements;
   calculating first relevance information which represents relevance between the first unit-image elements contained in each of the plurality of first character sequences based on the first pieces characteristic information;
   calculating second relevance information which represents relevance between the second unit-image elements contained in the second character sequences based on the second pieces characteristic information; and
   comparing the calculated first relevance information and the calculated second relevance information.

5. An image processing apparatus comprising:
   an inputting unit that inputs first image data as a reference and second image data to be compared with the first image data;
   a selecting unit that selects a plurality of first character sequences from different positions of the first image data, each of the plurality of first character sequences includes first unit-image elements;
   a determining unit that determines whether or not a second character sequence including second unit-image elements, having identity in an alignment of shapes with respect to the plurality of first character sequences, exists in the second image data;

a detecting unit that detects from the second character sequence determined not to exist in the second image data, a unit-image element not having the identity in the alignment of shapes with respect to the first image data among the second image data; and an output unit that outputs the detected unit-image element.

6. An image processing system, comprising:

an inputting unit that inputs first image data as a reference and second image data to be compared with the first image data;

a selecting unit that selects a plurality of first character sequences from different positions of the first image data, each of the plurality of first character sequences includes first unit-image elements;

a determining unit that determines whether or not a second character sequence including second unit-image elements, having identity in an alignment of shapes with respect to the plurality of first character sequences, exists in the second image data; and a detecting unit that detects from the second character sequence determined not to exist in the second image data, a unit-image element not having the identity in the alignment of shapes with respect to the first image data among the second image data; and an output unit that outputs the unit-image element detected by the detecting unit in a state capable of being compared with other unit-image elements contained in the second image data.

\* \* \* \* \*